Oct. 31, 1933.    L. RICEFIELD    1,933,072
COUPLING
Filed Feb. 29, 1928    2 Sheets-Sheet 1
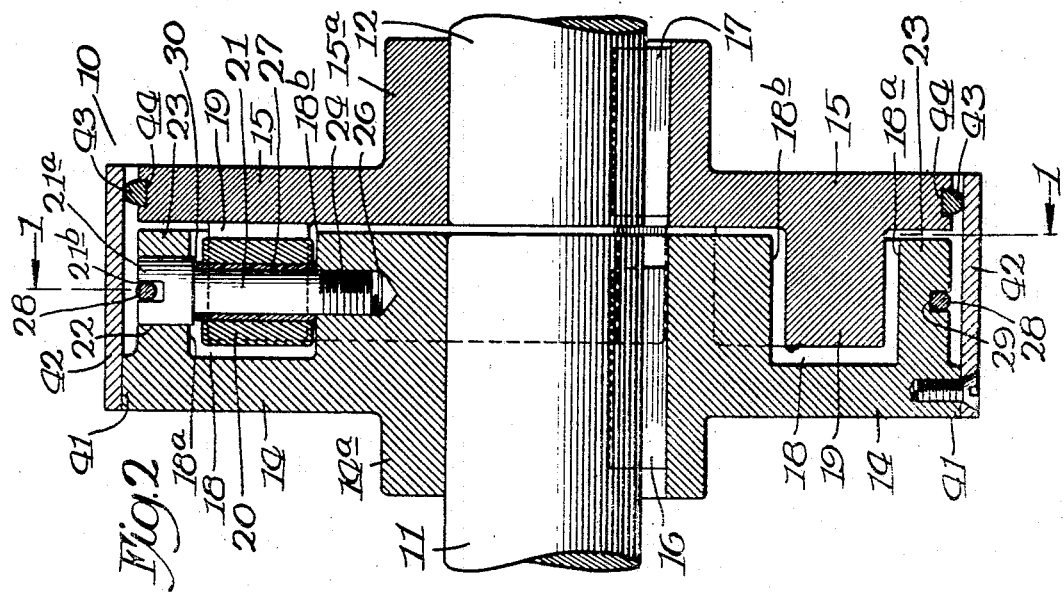
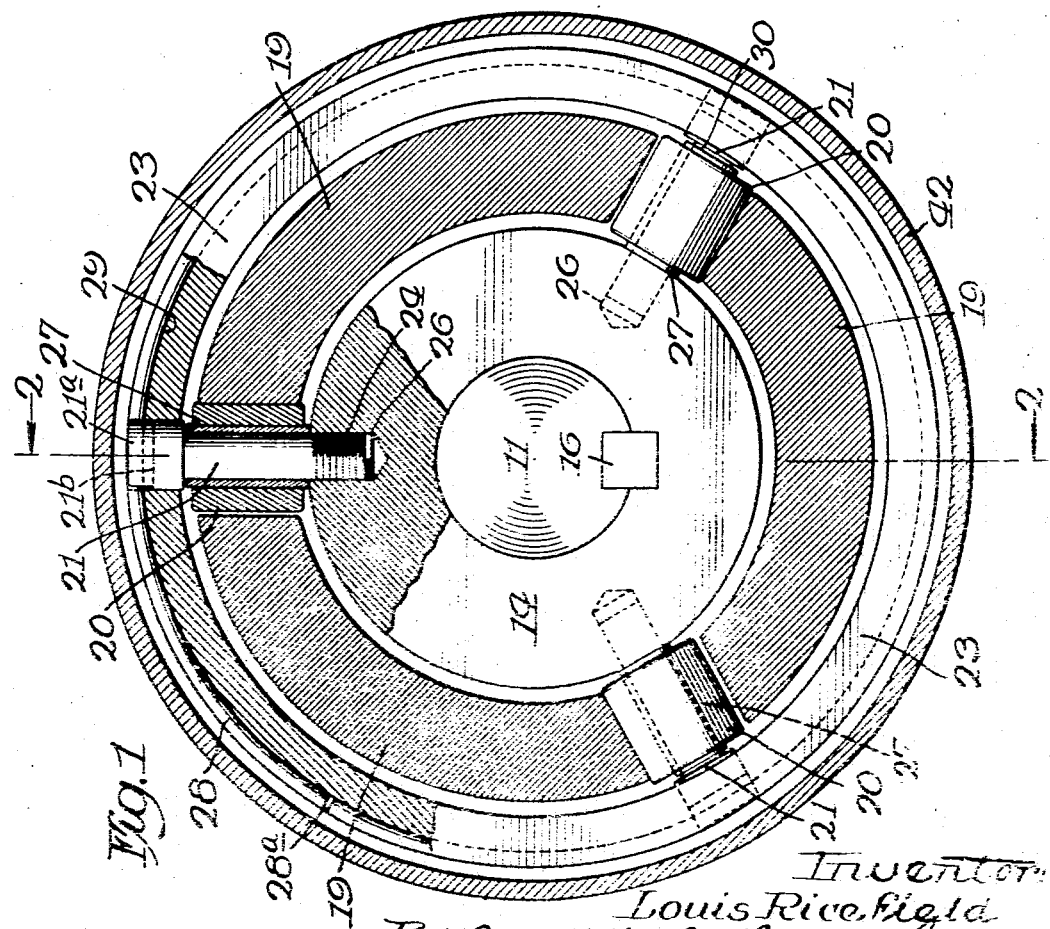
Inventor
Louis Ricefield
By Rector, Hibben, Davis & Macauley, Attys Oct. 31, 1933.  L. RICEFIELD  1,933,072
COUPLING
Filed Feb. 29, 1928  2 Sheets-Sheet 2
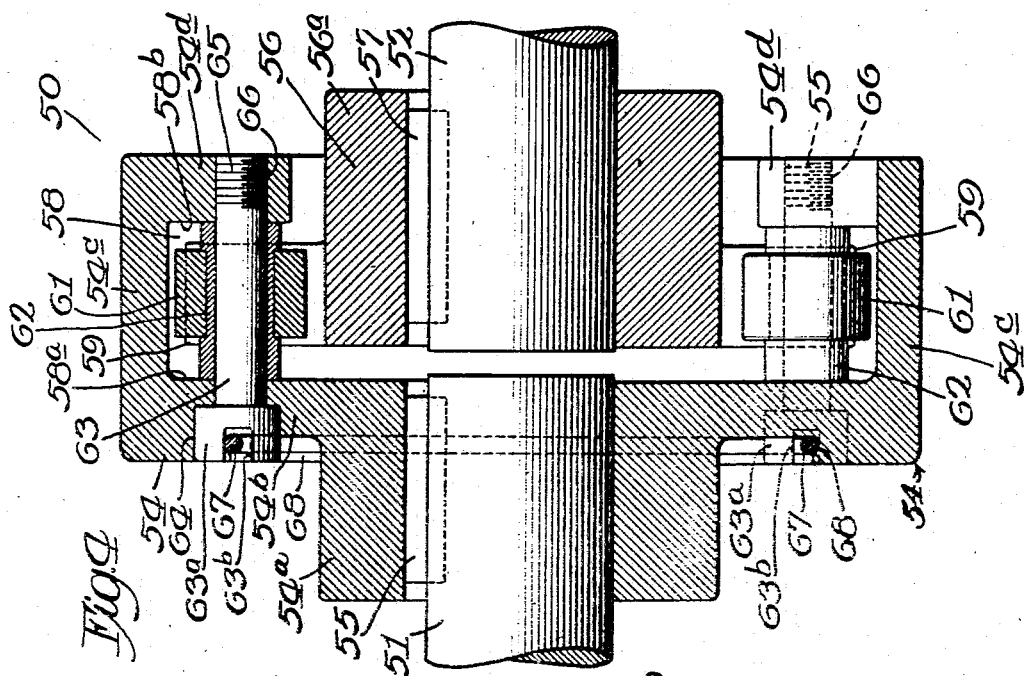
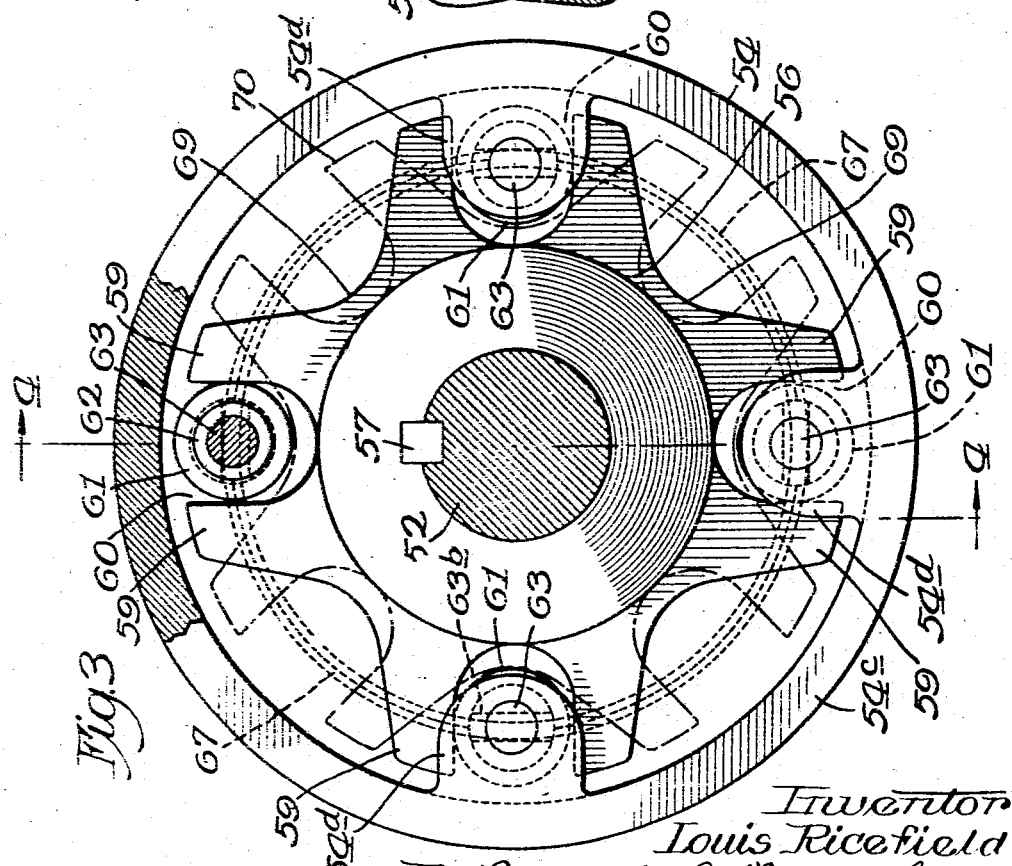
Inventor:
Louis Ricefield
By Rector, Hibben, Davis & Macauley, Attys.

Patented Oct. 31, 1933

1,933,072

UNITED STATES PATENT OFFICE 1,933,072

COUPLING

Louis Ricefield, Oak Park, Ill.

Application February 29, 1928. Serial No. 257,859

10 Claims. (Cl. 64—91)

This invention relates to improvements in couplings and the present application is in part a continuation of my prior co-pending application, Serial No. 154,322, filed December 13, 1926, now matured into Patent 1,748,146. The purpose of the invention is to provide improved means for forming a connection between shafts to permit relative longitudinal movement thereof and to permit relative radial displacement and angular misalignment of the axes of the shafts.

The principal object of the invention is to provide a coupling having a pair of coupling members one of which carries coacting parts having a rolling contact with parts of the other coupling member. A further object is to provide an improved coupling having means for permitting axial movement of one of the connecting shafts without imparting an end thrust to the other connected shaft. A further object is to provide a coupling comprising a pair of coupling members arranged so that the relative longitudinal movement of the connected shafts and inaccuracies in the alignment of the shafts are compensated for by the rolling movement of power transmitting members mounted on one of said coupling members and engaging parts of the other coupling member. A further object is to provide a coupling having a plurality of resilient power transmitting members. Still another object is to provide improved means for mounting the rotating power transmitting members on one of the coupling disks. Other objects relate to various features of construction and arrangement which will appear more fully hereinafter.

The nature of the invention will be understood from the following specification taken with the accompanying drawings in which two embodiments of the invention are illustrated. In the drawings, Figure 1 shows a vertical section through a coupling embodying the present invention, the section being taken on the line 1—1 of Fig. 2;

Fig. 2 shows a section through the axis of the coupling and the connected shafts on the line 2—2 of Fig. 1;

Fig. 3 shows an end elevation of a modified form of coupling with a portion thereof shown in section, and Fig. 4 shows a detailed sectional view taken on the line 4—4 of Fig. 3.

In the form of the invention shown in Figs. 1 and 2, the coupling 10 connects two shafts 11 and 12 which are substantially in axial alignment with each other. The coupling 10 comprises two coupling disks 14 and 15. The hub 14$^a$ of one disk is secured on the shaft 11 by a key 16 and the hub 15$^a$ of the other disk is secured on the shaft 12 by means of a key 17. The disk 14 is relatively thick, measured parallel to the axis of the shaft 11, and it is provided some distance outwardly from the shaft with an inner annular groove or recess 18 of substantially rectangular cross section. This groove 18 is adapted to receive a plurality of arcuate jaws 19 which are formed on the other coupling disk 15. The outer wall 18$^a$ of the recess 18 is spaced from the outer curved surfaces of the jaws 19 and the inner wall 18$^b$ of the recess 18 is spaced inwardly from the inner curved surfaces of the jaws 19 so that there is sufficient clearance to allow for compensation for misalignment of the shafts 11 and 12. The driving forces are transmitted from one shaft to the other through a plurality of cylindrical rollers 20 which are mounted within the annular recess 18 to rotate upon trunnions 21. These trunnions are in the form of screws having cylindrical heads 21$^a$ which closely fit openings 22 formed in the annular flange 23 which constitutes the outer wall of the recess 18. The inner ends of the trunnions 21 are threaded as shown at 24 to engage threaded holes 26 which are formed in the inner wall of the annular recess 18. The rollers 20 are formed preferably of rubber with the exception of an inner core or bushing 27 of metal upon which the rubber portions of the rollers are fixed. Each metal core or bushing 27 is mounted to rotate upon one of the trunnions 21 and its ends project slightly beyond the ends of the rubber portion of the roller so that the rubber end faces of the rollers are maintained at all times out of contact with the circular walls of the recess 18.

The trunnions 21 are adapted to be rotated by the engagement of a screw driver with the transverse grooves 21$^b$ which are formed in the heads thereof and the threads 25 on the inner ends of these trunnions are relatively fine so that one revolution of the trunnions will produce only a relatively small longitudinal displacement thereof. By this arrangement, it is possible to mount the rollers 20 in place and adjust the trunnions 21 so that all of the grooves 21$^b$ will lie in a plane perpendicular to the axes of the shafts 11 and 12, thus permitting them to be engaged by an annular spring ring 28 which is adapted to lie in an annular groove 29 formed in the outer face of the flange 23. The ring 28 is split at 28$^a$ so that it can be sprung outwardly to release the heads of the trunnions 21 and permit radial adjustment or removal. The fine threads 25 permit the necessary degree of rotation of any trunnion 21 to bring the slot 21$^b$ in proper position without causing the inner end of the head 21$^a$ of the trunnion to engage the end of the metal core or brushing 27 of the roller which is mounted on that trunnion. To prevent this possibility, a small clearance 30 is preferably provided so that some latitude of adjustment of the trunnions is permitted.

The end faces of the jaws 19 which engage the rollers are parallel to radial planes containing the axis of the coupling member 15. The disk 14 is provided with an annular shoulder 41 on which there is secured an annular sleeve or collar 42 having a width corresponding to the normal distance between the outer radial faces of the disks 14 and 15. The sleeve 42 thus overlaps the outer cylindrical edge of the disk 15 and its inner face is engaged by a resilient annular ring 43 of rubber, felt, or other material which is seated in a groove 44 formed in the face of the disk 15 and which prevents dust and moisture from entering the inner parts of the coupling while at the same time allowing for compensation for radial and angular misalignment of the shafts 11 and 12. With this coupling, longitudinal relative movement of the two shafts and angular and radial misalignment of the shafts are compensated for, whether they occur singly or simultaneously. Forces are normally transmitted by rolling contact of the rollers 20 on the flat surfaces of the jaws 19. Relative longitudinal movement of the shafts is permitted by the rolling of the rollers on the flat surfaces of the jaws without setting up any stresses other than power transmitting forces and when angular or radial misalignment of the shafts occurs, such non-power transmitting stresses as occur exist only to the extent required to distort the rubber of the rollers to the amount of the misalignment. With this arrangement, there is a definite positioning of the rollers 20 and the thrusts imparted to them are received by the pins or trunnions 21 which are anchored at both ends in rigid parts of the coupling member 14. In Figs. 3 and 4 of the drawings there is illustrated a modification in which the axes of the power transmitting rollers are parallel to the axes of the connected shafts instead of being radial thereto as in the embodiment previously described. In this modification, the coupling 50 is shown as connecting a shaft 51 with a substantially aligned shaft 52. A coupling member 54 has its hub 54$^a$ secured on the shaft 51 by means of a key 55 and a complementary coupling member 56 has its hub 56$^a$ secured on the shaft 52 by means of a key 57. The disk of the coupling member 54 which extends radially outward from the shaft 51 as shown at 54$^b$, is formed integrally with a cylindrical portion 54$^c$ which is substantially concentric with the axes of the aligned shafts and which has formed on the outer end thereof a plurality of ears 54$^d$ which extend radially inward parallel to the disk 54$^b$. There is thus formed an intermediate inwardly directed groove or recess 58 of annular form which is adapted to receive a plurality of jaws 59 formed on the coupling member 56. The jaws 59 are spaced from the surfaces 58$^a$ at one side of the groove 58 and also from the radial surface 58$^b$ at the other side of this groove, thus allowing clearance for compensation for angular misalignment of the shafts. The jaws 59 are arranged in pairs, as shown in Fig. 3, leaving substantially U-shaped openings 60 between them which are adapted to receive the power transmitting rollers 61. These rollers are formed preferably of hard rubber mounted on inner cores or sleeves 62 of metal which are adapted to rotate on the trunnions 63 which extend parallel to the axis of the shaft 61 and which engage the disk 54$^b$ and also the ears 54$^d$, extending radially inward from the cylindrical portion 54$^c$ of the coupling member. The trunnions 63 have enlarged heads 63$^a$ which engage apertures 64 in the disk 54$^b$ and the other ends of these trunnions are threaded as shown at 65 to engage threaded apertures 66 in the ears 54$^d$. The heads of the trunnions are provided with slots 63$^b$ for engagement by a screw driver in effecting rotation. These slots are adapted to be lined up so that they will lie on a circle and will be adapted to receive a split locking ring 67 which is adapted to expand outwardly and be retained in the undercut groove 68 which is formed in the end face of the coupling member 54. The trunnions 63 are thus locked securely against rotation but, upon removing the ring 67, the trunnions may be withdrawn to permit removal of the rollers 61. With this arrangement of the rollers having their axes extending parallel to the axis of the shaft 51, radial misalignment of the shafts is compensated for by rolling contact of the rollers 61 on the flat end faces of the jaws 59 and compression of the rollers, and an angular misalignment of the shafts, and also end play thereof, is compensated for by the rotation of the rollers and their distortion in a direction parallel to their axes.

With the arrangement of the jaws in pairs as shown in Fig. 3, including a spaced relation thereof by leaving intermediate recesses 69 between the jaws, it is possible to assemble the device by rotating one coupling member to a position shown by dotted lines 70 wherein the coupling member 11 may be moved longitudinally of the shafts to cause the jaws to pass between the inwardly directed ears 54$^d$. Then upon rotating the coupling member 56 to cause the U-shaped slots 60 to align with the ears 54$^d$, the rollers 61 and trunnions 63 can be assembled without difficulty. This permits both of the coupling member 54 and 56 to be made as integral parts except for the trunnions and rollers which are attached to the coupling member 54.

Although two modifications of the invention have been shown and described by way of illustration, it will be understood that it may be constructed in various other forms within the scope of the appended claims.

I claim:

1. The combination in a coupling for connecting substantially aligned shafts, of a pair of disks each adapted to be fixed on a separate one of said shafts, a plurality of power transmitting rollers, a plurality of bearings for said rollers each having a support on one of said disks at each end of its roller, and means carried by the other of said disks having flat surfaces on which said rollers are adapted to have relative rolling movement.

2. The combination in a coupling for connecting substantially aligned shafts, of a pair of disks each adapted to be fixed on a separate one of said shafts, a plurality of power transmitting rollers, a bearing for each of said rollers removably mounted on one of said disks, means for locking said bearings in adjusted position against rotation, and means carried by the other of said disks having surfaces on which said rollers are adapted to have relative rolling movement.

3. The combination in a coupling for connecting substantially aligned shafts, of a pair of disks each adapted to be fixed on a separate one of said shafts, a plurality of power transmitting rollers, a trunnion for each of said rollers having a detachable threaded engagement with one of said disks, said trunnions having transverse slots therein, a locking ring adapted to detachably engage such slots, and means carried by the other of said disks having surfaces on which said rollers are adapted to have relative rolling movement.

4. The combination in a coupling for connecting substantially aligned shafts, of a pair of disks each adapted to be fixed on a separate one of said shafts, a plurality of power transmitting rollers, a trunnion for each of said rollers having detachable threaded engagement with one of said disks, said trunnions having slots therein, said last mentioned disk having a recess with which said slots are adapted to align, a locking ring adapted to engage said slots and said recess, and means carried by the other of said disks on which said rollers are adapted to have relative rolling movement.

5. The combination in a coupling for connecting substantially aligned shafts, of a pair of disks each adapted to be fixed on a separate one of said shafts, a plurality of power transmitting rollers each comprising a resilient member mounted on a metallic bushing, a trunnion engaging each of said bushings and having a support at each end thereof on one of said disks, and means carried by the other of said disks having flat surfaces on opposite sides of each of said rollers on which said rollers are adapted to have relative rolling movement.

6. The combination in a coupling for connecting substantially aligned shafts of a pair of disks each adapted to be fixed on a separate one of said shafts, one of said disks having an annular groove, a plurality of power-transmitting rollers located in said groove, a trunnion for each of said rollers having its ends supported in opposite walls of said groove, and means carried by the other of said disks having surfaces on which said rollers are adapted to have relative rolling movement.

7. The combination in a coupling for connecting substantially aligned shafts of a pair of disks each adapted to be fixed on a separate one of said shafts, one of said disks having an annular groove therein, a plurality of power transmitting rollers located in said groove, the walls of said groove having aligned apertures on opposite sides thereof, a plurality of trunnions each engaging an aperture in one wall of said groove and threadedly engaging an aperture in the other wall of said groove, and means carried by the other of said disks for coacting with said rollers.

8. The combination in a coupling for connecting substantially aligned shafts, of a pair of disks each adapted to be fixed on a separate one of said shafts, one of said disks having an annular groove therein, a plurality of power transmitting rollers located in said groove, the walls of said groove having aligned apertures on opposite sides thereof, a plurality of trunnions each engaging an aperture in one wall of said groove and threadedly engaging an aperture in the other wall of said groove, said trunnions having slotted ends, said last mentioned disk having an annular recess with which the slots in said trunnion are adapted to align, a resilient locking ring adapted to engage said recess and said slots, and means carried by the other of said disks for coacting with said rollers.

9. The combination in a coupling for connecting substantially aligned shafts, of a pair of disks each adapted to be fixed on a separate one of said shafts, a plurality of power transmitting rollers each having its axis extending radially from the axes of said shafts, a plurality of trunnions for said rollers each having supports at both ends and one of said disks, and means carried by the other disk having flat surfaces on which said rollers are adapted to have relative rolling movement to compensate for end-play and misalignment of said shafts.

10. The combination in a coupling for connecting substantially aligned shafts, of a pair of disks each adapted to be rigidly secured on a separate one of said shafts, a plurality of cylindrical power-transmitting rollers having their axes extending radially of said disks, means for supporting said rollers at each end thereof on and adjacent to portions of one of said disks, and means carried by the other of said disks having flat surfaces on opposite sides of each of said rollers on which said rollers are adapted to have relative rolling movement to compensate for angular and lateral displacement of said shafts and for relative longitudinal movement thereof.

LOUIS RICEFIELD.